(12) United States Patent
Granullaque Diaz et al.

(10) Patent No.: US 11,914,207 B2
(45) Date of Patent: Feb. 27, 2024

(54) FIBER OPTIC NETWORKS AND TERMINALS HAVING WIRELESS CONNECTIVITY

(71) Applicant: Corning Research & Development Corporation, Corning, NY (US)

(72) Inventors: Vanesa Granullaque Diaz, Madrid (ES); Radawan Ripumaree, Hickory, NC (US); Sattam Sengupta, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 410 days.

(21) Appl. No.: 17/314,685

(22) Filed: May 7, 2021

(65) Prior Publication Data

US 2021/0263253 A1 Aug. 26, 2021

Related U.S. Application Data

(63) Continuation of application No. PCT/US2019/060046, filed on Nov. 6, 2019.
(Continued)

(51) Int. Cl.
*G02B 6/44* (2006.01)
*H04B 10/2575* (2013.01)
*H04W 88/08* (2009.01)

(52) U.S. Cl.
CPC ..... *G02B 6/4448* (2013.01); *H04B 10/25753* (2013.01); *G02B 6/4454* (2013.01); *G02B 6/4472* (2013.01); *H04W 88/08* (2013.01)

(58) Field of Classification Search
CPC ... G02B 6/444–44515; H04B 10/2575–25759; H04W 88/085
See application file for complete search history.

(56) References Cited

U.S. PATENT DOCUMENTS 7,599,597 B2  10/2009  Kerry et al.
7,660,508 B2  2/2010  Mures et al.
(Continued)

FOREIGN PATENT DOCUMENTS

CN  203242401 U  10/2013
CN  107728274 A  2/2018
(Continued)

OTHER PUBLICATIONS

International Search Report and Written Opinion of the International Searching Authority; PCT/US19/60046; dated Jun. 24, 2020; 15 Pages; European Patent Office.
(Continued)

*Primary Examiner* — Michael Stahl
(74) *Attorney, Agent, or Firm* — William D. Doyle

(57) ABSTRACT

A fiber optic terminal having a radio access node for providing wireless connectivity within a coverage area. The fiber optic terminal can also include active modules capable of gathering data and reporting the data to a network operator. The active modules can be accommodated at the exterior of a terminal and may gather data such as information relating to the environment of the terminal. Active terminals can also be accommodated within the terminal and can gather and/or process information such as an operating status of a network, terminal operating status, and other information.

18 Claims, 7 Drawing Sheets

Related U.S. Application Data

(60) Provisional application No. 62/869,479, filed on Jul. 1, 2019, provisional application No. 62/798,557, filed on Jan. 30, 2019, provisional application No. 62/758,015, filed on Nov. 9, 2018.

(56) References Cited

U.S. PATENT DOCUMENTS

| | | | |
|---|---|---|---|
| 8,213,760 | B2 | 7/2012 | Rudenick et al. |
| 9,977,208 | B2 | 5/2018 | Huegerich et al. |
| 10,288,829 | B2 | 5/2019 | Claessens et al. |
| 2009/0310972 | A1* | 12/2009 | Wayman .......... H04B 10/25758 398/115 |
| 2010/0226654 | A1 | 9/2010 | Smith et al. |
| 2011/0293277 | A1 | 12/2011 | Bradea et al. |
| 2011/0311226 | A1* | 12/2011 | Smith .............. H04B 10/25753 398/45 |
| 2014/0268597 | A1 | 9/2014 | Lebo et al. |
| 2015/0035704 | A1 | 2/2015 | Schwengler et al. |
| 2016/0091681 | A1 | 3/2016 | Hanson et al. |
| 2018/0048392 | A1 | 2/2018 | Amundson |
| 2021/0223493 | A1* | 7/2021 | Webb ................... G02B 6/4448 |

FOREIGN PATENT DOCUMENTS

| | | |
|---|---|---|
| CN | 107861204 A | 3/2018 |
| WO | 2013/162988 A1 | 10/2013 |
| WO | 2014/129966 A1 | 8/2014 |
| WO | 2017/046190 A2 | 3/2017 |
| WO | 2018/090582 A1 | 5/2018 |

OTHER PUBLICATIONS

International Search Report and Written Opinion of the International Searching Authority; PCT/US2019/053961; dated Jan. 21, 2020, 12 pages; European Patent Office.

Placing Small Cells on Wooden Electric Distribution Poles, May 16, 2017.

* cited by examiner

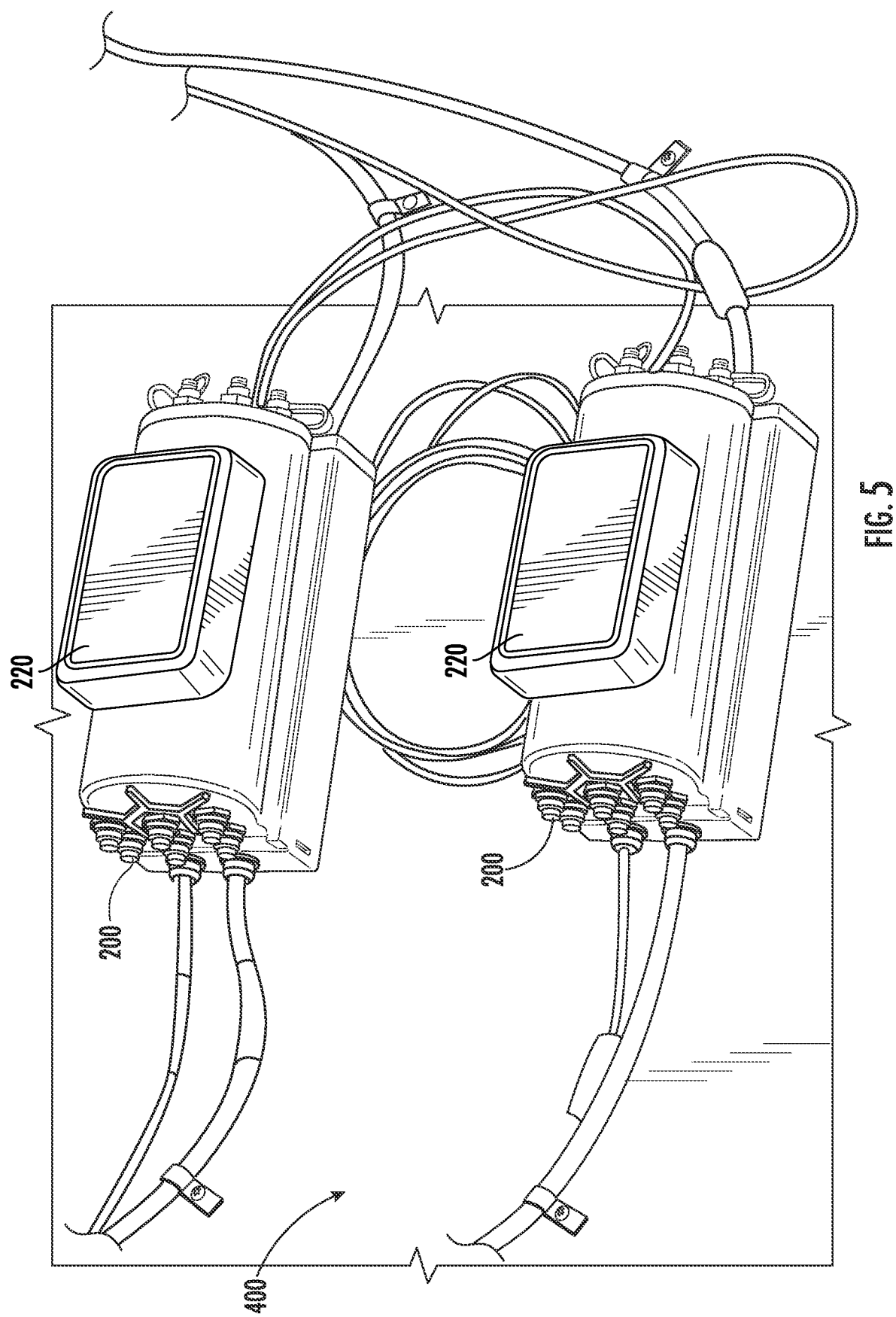

FIBER OPTIC NETWORKS AND TERMINALS HAVING WIRELESS CONNECTIVITY

PRIORITY APPLICATIONS

This application is a continuation of International Application No. PCT/US2019/060046, filed Nov. 6, 2019, which claims priority to U.S. Provisional Application 62/758,015, filed Nov. 9, 2018, U.S. Provisional Application 62/798,557, filed Jan. 30, 2019, and U.S. Provisional Application 62/869,479, filed Jul. 1, 2019, the entire contents of which are incorporated by reference.

This application is related to International Application PCT/US2019/053961, filed Oct. 1, 2019, U.S. Application No. 62/938,609, filed Nov. 21, 2019, U.S. Application No. 62/869,468, filed Jul. 1, 2019, U.S. Application No. 62/869,456, filed Jul. 1, 2019, U.S. Application No. 62/877,795, filed Jul. 23, 2019, U.S. Application No. 62/928,065, filed Oct. 30, 2019, U.S. Application No. 62/869,318, filed Jul. 1, 2019, and U.S. Application No. 63/079,054, filed Sep. 16, 2020.

BACKGROUND

Technical Field

The present invention relates generally to fiber optic devices, and more particularly to fiber optic devices arranged in distribution network architectures and having wireless connectivity capabilities.

Technical Background

As a result of the ever-increasing demand for broadband communications, telecommunication and cable media, service providers and/or network operators are expanding their fiber optic networks to increase their networks' capacity and reach to provide more services, applications and information to more subscribers. To facilitate this capacity and reach, the fiber optic networks employ additional fiber optic cable, hardware and components, resulting in increased installation time, cost and maintenance. This results in the fiber optic networks becoming more complex, requiring architectures that allow for the most efficient delivery of services to subscribers. These architectures may be configured by employing fiber optic network devices such as optical terminals in branches of the fiber optic network. The fiber optic network devices act to optically interconnect the fiber optic cables of the branch, separate or combine optical fibers in multi-fiber cables, and/or split or couple optical signals, as may be necessary for the configuration of the architecture.

Carriers have deployed optical connectivity terminals in various environments, such as metropolitan areas, as part of fiber optic connectivity networks. Fiber networks can be used as backhaul to enable cellular connectivity, Internet of Things (IoT) connectivity, and passive connectivity. In general, the larger the number of businesses and residential sites, larger the number of fiber closures needed to enable a fiber solution.

A small cell may be generally defined as a radio access point or node with low radio frequency (RF) power output, footprint and range. Small cells may be operator-controlled, and operate in licensed, shared, and/or unlicensed spectra, and can be deployed in indoor and outdoor environments. Both indoor and outdoor small cell markets are growing as operators ramp up small cell deployments to fill in coverage and capacity "holes" missed by the initial LTE macro coverage rollout.

The deployment of outdoor small cells is hampered due in part due to limited locations where outdoor small cells can be deployed, and the availability of power to the cells. Due to their relatively small coverage areas, small cells are placed relatively near to users and ideally a few meters above the ground for good line of sight. Lamp posts, utility poles, roofs or wall mounts are examples of typical locations where operators look to install outdoor small cells. The difficulty lies in that local and state regulations restrict the locations where small cells can be placed, as well as their size and appearance. As a result, operators must negotiate with local councils, buildings owners, utility companies, and others to obtain permission to install small cells in desirable locations.

No admission is made that any reference cited herein constitutes prior art. Applicant expressly reserves the right to challenge the accuracy and pertinency of any cited documents.

SUMMARY

According to one aspect, a fiber optic terminal comprises an enclosure having a base and a cover connected to the base and having a plurality of connector ports, wherein the base and the cover define an interior. Fiber optic connectivity hardware is disposed within the interior, wherein at least one optical fiber cable optically couples at least one of the connector ports to the fiber optic hardware. A powered control module is coupled to at least one of the connector ports. The terminal further comprises a plurality of active modules, at least one of the active modules comprising a radio access node. The radio access node is configured to provide radio-frequency connectivity to users within a coverage area of the radio access node.

According to another aspect, a network comprises a plurality of primary concentrations including a plurality of terminals, a plurality of feeder cables optically coupling the primary concentrations to an access node, and a plurality of distribution cables optically coupled to the primary concentrations and configured to convey optical communications to at least one of a plurality of enterprise subscriber locations and a plurality of residential subscriber premises. One or more of the terminals can include a radio access node for providing radio-frequency connectivity to users.

According to the embodiments of the present invention, fiber optic terminals can be provided with radio access nodes. Radio access nodes deployed with fiber optic terminals optimize usage of the footprint of fiber optic terminals, and can utilize the terminal's fiber backhaul for central office connectivity.

According to another aspect, radio access nodes can access power from a power source deployed in or accessed via active hardware within a fiber optic terminal.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The drawings are included to provide a further understanding, and are incorporated in and constitute a part of this specification. The drawings illustrate one or more embodiment(s), and together with the description explain principles and operation of the various embodiments.

BRIEF DESCRIPTION OF THE FIGURES

FIG. 5 illustrates an exemplary deployment environment for network terminals according to the present embodiments.

DETAILED DESCRIPTION

Figure 1:
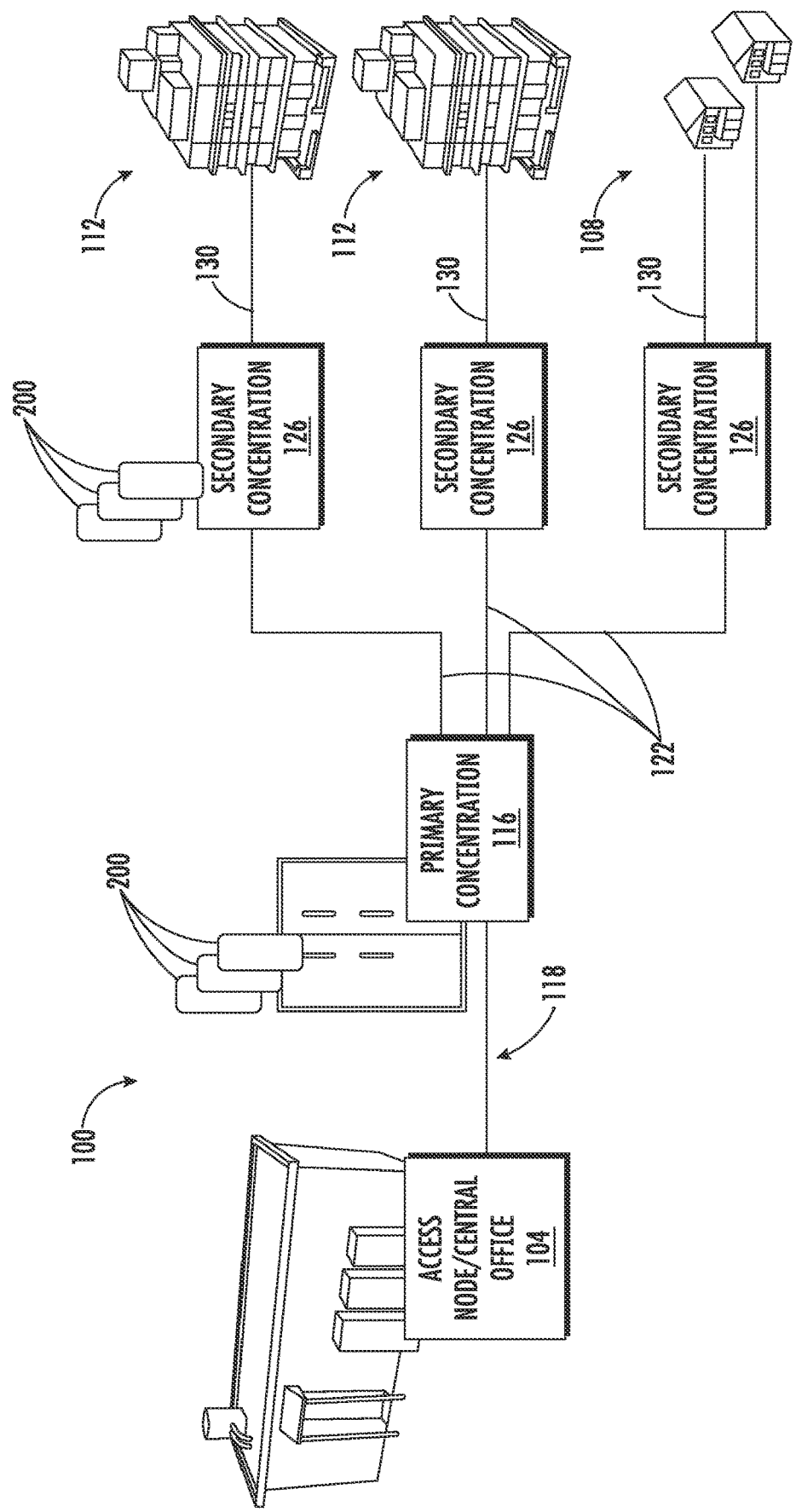
FIG. 1 is a schematic of a network according to a present embodiment.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

To facilitate the description of the various terminal embodiments, the terms "optical terminal," "fiber optic terminal," "zone terminal," "branch-connected terminal," and/or "series-connected terminal" may be used. As used herein these terms are not limited to any specific type, style, structure, construction or arrangement of fiber optic network device. Accordingly, for purposes herein "optical terminal," "fiber optic terminal," "zone terminal," "branch-connected terminal," and/or "series-connected terminal" shall mean and include devices and/or structures which may typically be referred to as a local convergence point, a fiber distribution hub, a fiber distribution cabinet, a splitter cabinet, a multiport, a fiber terminal, a multiple dwelling closure, a local convergence cabinet, a pedestal, a network access point, a distribution closure, and the like.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets, or the like. In this specification, a fiber optic cable may include electrical conductors for powering active modules and for other purposes, such cables being referred to as "composite cables" or sometimes "hybrid cables."

As used herein and well known and understood in the art, "feeder cable" shall include any one or more of fiber optic cables originating from a central office of a telecommunications service provider or operator, or a transport cable from a head end of cable media service provider or operator. The term "distribution cable" shall mean any cable optically connected to a feeder cable or a transport cable, either directly or through a fiber optic component such as a splitter, and used to further distribute the optical services toward a subscriber premises. The term "branch cable," "sub-branch cable," "series cable," "tether cable," and/or "stub cable" shall include any fiber optic cable that may optically connect, directly or indirectly, to and/or extend from a distribution cable and/or a feeder cable for the purpose of optically connecting the distribution cable to a drop cable. The term "drop cable" shall include a fiber optic cable extending towards a subscriber premises. The feeder cable, distribution cable, branch cable, sub-branch cable, series cable, tether cable, stub cable and/or drop cable may be any type of fiber optic cable having one or more optical fibers.

A drop cable may be pre-connectorized to be readily connected to and disconnected from a drop port of an optical terminal. At the other end, the drop cable may be optically coupled to optical fibers within a closure or optical network terminal (ONT). Drop cables may extend from a closure located at a subscriber premises and may be optically coupled through the drop ports of an optical terminal to optical fibers of the distribution cable, either directly or indirectly through a branch cable, a sub-branch cable, a series cable, a tether cable, and/or a stub cable, or other optical components. Optical fibers of the distribution cable may be optically connected to the feeder cable, and thus to the central office. As such, the optical terminal provides an accessible interconnection terminal for readily connecting, disconnecting or reconfiguring distribution cables, branch cables, sub-branch cables, series cables, tether cables, stub cables and/or drop cables, and optical components and hardware in the optical network, and, thereby reconfiguring the architecture of the optical network.

For purposes herein, reference to "upstream" shall mean in the direction toward a central office or location of the network operator. Reference to "downstream" shall mean in a direction toward the subscriber premises, sometimes referred to as the network terminus or "edge." Use of the terms "upstream" or "downstream" does not indicate the direction in which the optical signals are transmitted or carried in the optical fibers because optical signals may be transmitted in both the upstream and downstream directions.

Referring to FIG. 1, there is shown a fiber optic network 100 having a distribution architecture. The fiber optic network 100 may have an architecture based on any number of zones. Each zone is a portion of the fiber optic network 100 and may be configured to facilitate the provision of optical communication services from the service provider to subscribers within the zone. The network 100 provides connectivity from an access node 104, which may connect to or may be, for example, a central office, to the network edge. The network 100 can terminate, for example, at subscriber premises such as residential subscriber premises 108, enterprise subscriber locations 112, and at other sub scriber endpoints.

Optical terminals provide intermediate points or nodes for providing and accessing optical components and the fiber optic cables. In the embodiment shown in FIG. 1, a primary concentration 116 of fiber optic connectivity hardware components is connected to the central office 104 by one or more feeder cables 118. In an exemplary network, there may be thousands of cabinets at such primary concentrations points. Distribution cables 122 connect the primary concentration 116 to multiple secondary connectivity concentrations 126, which in turn connect to the network edge subscribers via drop cables 130. In an exemplary network, there may be thousands of cabinets at such secondary concentrations points. According to one aspect of the present embodiments, one or more of the primary concentrations 116 and secondary concentrations 126, for example, can include one or more multi-functional terminals 200 according to the present embodiments.

Terminals 200 according to the present embodiments can include active components and passive components that provide cellular connectivity, enable active data gathering and routing functionalities to the network 100, such as, for example, IoT or "smart" functionalities, as well as providing passive optical connectivity, upstream and downstream of the terminals. Because a large number of optical terminals are already deployed in many networks, cellular connectivity can be added to an existing network by leveraging the deployed base of optical terminals with no or minimal additional hardware footprint in the deployment environment. The consolidation of the optical connectivity functions of a terminal along with active components such as radio access nodes makes more efficient use of space within terminal enclosures, thus reducing deployment and material costs, network management cost, visual impact, and regulatory burdens associated with deploying such hardware. Examples of active functionalities that can be deployed in a network include wireless connectivity via small cells and other radio access nodes, measurement of data concerning the environment in which the terminal is deployed, power collection, processing and distribution, and collecting status information regarding the integrity and function of the terminal as well as the network.

Figure 2:
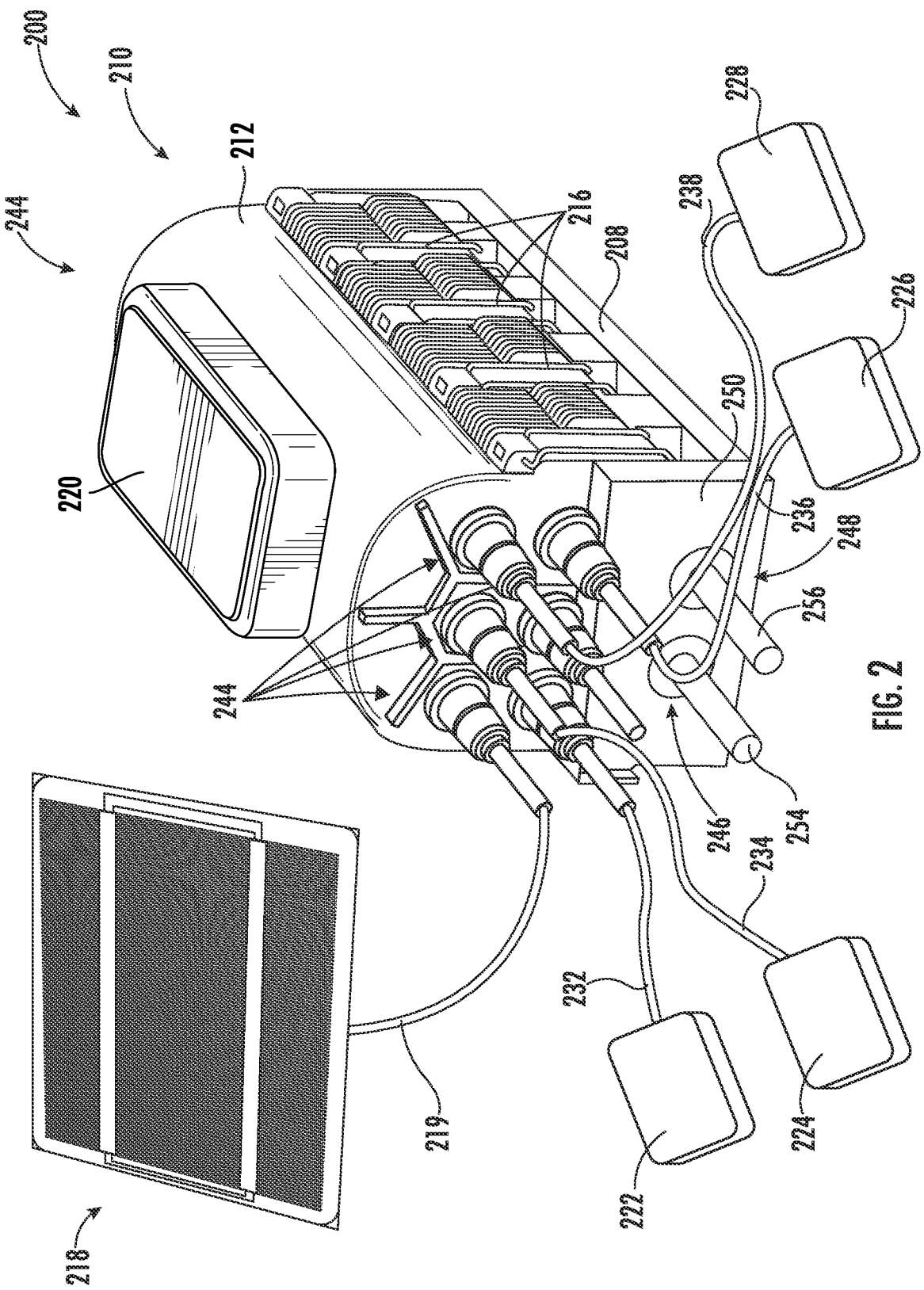
FIG. 2 is a perspective view of a terminal according to a present embodiment.

FIG. 2 is a perspective view of a terminal 200 according to an embodiment of the present disclosure, with the terminal 200 being closed as it would be when deployed in the network 100. The exemplary terminal 200 includes both active and passive components and is configured to provide passive optical connectivity as well as, wireless connectivity, and active measurement and data collection for network management and performance monitoring, deployment environment monitoring, and for other purposes. The terminal 200 described in detail below includes a wide variety of active components for illustrative purposes; when deploying a network, each terminal 200 can be provided with, for example, a selection of active and passive hardware designed to satisfy location-specific requirements identified by the network planner.

The terminal 200 includes an enclosure 210 having a base 208 and a cover 212. The base 208 and cover 212 can each made of a lightweight yet rigid material, such as aluminum or other metal, a plastic such as a thermoplastic, and polymers. The material of construction for the terminal 200 should generally be constructed from a durable water-impervious material if the terminal is intended for deployment in outdoor environments. In the illustrated exemplary embodiment, both the base and cover are made from a plastic. The base 208 is hingedly attached to the cover 212, and may be secured in the closed position by a plurality of latches 216. The base 208 and cover 212 are configured to form an environmentally water-tight seal when in the closed position. The terminal 200 may be configured for mounting on exterior building surfaces, telephone poles, and other structures visible to the public, and may thus be relatively small in size. For example, the length of the terminal 200, measured from one end to the opposite end of the base 208, may be less than one meter. According to another embodiment, the length of the terminal from one end to the opposite end may be less than 50 centimeters.

A plurality of external modules 218, 220, 222, 224, 226, 228 are shown connected to the enclosure 210. Modules 218, 222, 224, 226, 228 are connected to the enclosure 210 by cables 219, 232, 234, 236, 238, respectively. The module 220 is a radio access node module 220 connected directly to the exterior, "upper" surface of the cover 212. In general, the external modules are positioned to gather or measure data that is most efficiently obtained from outside of the enclosure 210, or to provide services most efficiently provided from the terminal exterior.

The cover 212 includes a plurality of connector ports 244 for connectivity to the external modules, for providing connectivity to drop cables, distribution cables, feeder cables, and other communication and/or power conducting media. In one embodiment, the connector ports 244 are configured such that they may connect interchangeably with a variety of modules and cables. Multiple, such as four or more, connector ports 244 can be included at either end or both ends of the cover 212. The term "connector port" as used in this specification does not require that a port connect, for example, to a terminated cable at a connector located at the port. The term "connector port" instead also encompasses a pass-through connection of, for example, an intact, non-terminated fiber-optic cable from the enclosure's exterior to the enclosure's interior. In such cases a connector port may include a water-tight seal that conforms to the cable exterior.

The base 208 may also include a plurality of connector ports 246, 248 on an end wall 250. The opposite end wall 250 of the base 208, not visible in FIG. 2, may also include one or more connector ports. In the illustrated embodiment, the base 208 includes two connector ports 246, 248 on each end of the base, with cables 254, 256 (stubs of cables are only shown in FIG. 2) connected at the connector ports 246, 248 respectively. The end walls 250 are generally planar walls located at opposed ends of the base 208 and connected to one another by opposed side walls of the base 208, as well as a generally planar bottom wall of the base 208.

Figure 3:
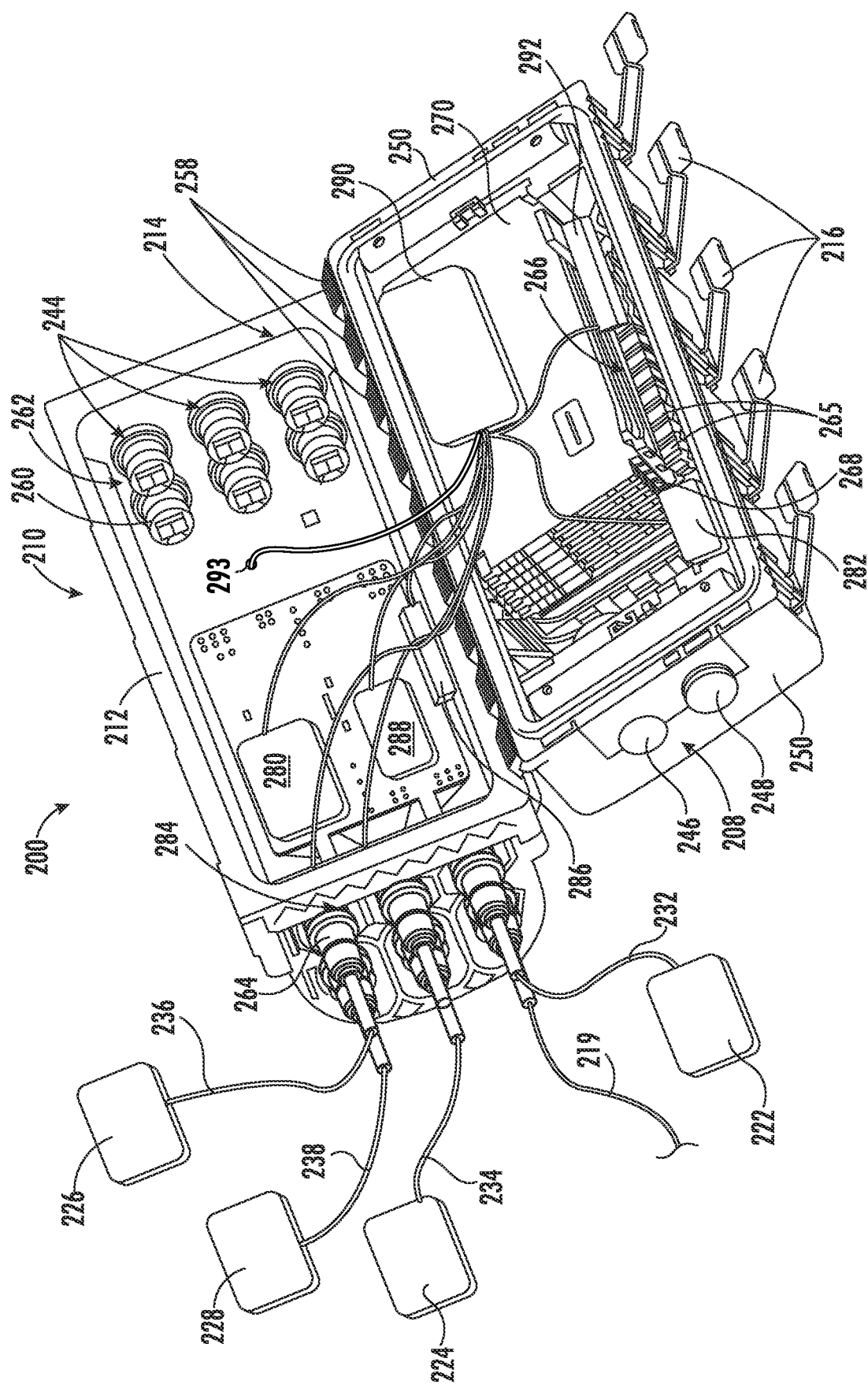
FIG. 3 illustrates the terminal of FIG. 2 in an opened state.

FIG. 3 shows the cover 212 in an open position (the solar power module 218 is not shown in FIG. 3 for clarity of illustration). The base 208 and the cover 212 together are generally "lunch pail" shaped and define a terminal interior 214. As shown, the cover 212 has a generally arcuate or dome-shaped upper section and is hingedly affixed to the base 208 along the upper edge of one of the base sidewalls at one or more hinges 258. The cover 212 may have any shape that is suitable for housing a plurality of branch ports and/or drop ports located within an external wall of the enclosure 210. Examples of such ports are disclosed in International Publication No. WO 2010/093794, the entire contents of which are incorporated by reference herein. In one configuration, a connector port can include an adapter that is engaged (such as by a locking ring) with an aperture in the enclosure. Connector ports 244 shown in FIG. 3 may include such adapters 260 engaged apertures 262 in the cover 212. Feeder cables, distribution cables, or cables connected to external modules, can be terminated with a hardened external connector, such as the termination 264 called out in FIG. 3 at the opposite end of the terminal 200. The termination 264 is configured to engage with an adapter 260 from the exterior of the enclosure 210. To obtain connectivity with active and/or passive hardware within the enclosure 210, another cable having a termination suitable to mate with the adapter 260 from the terminal interior 214 is plugged into the other side of the adapter.

In FIG. 3, the connector port 246 is shown without an adapter, illustrating the aperture in the end wall 250 in which an adapter may be received. If a pass-through connection is to be used at the connector port 246, a seal or other connection can be provided so that a cable can extend from the enclosure exterior to the interior 214 without use of a hardened connector. The connector port 248 is shown not connected to any cable, and is instead covered with a cap. The base 208 and the cover 212 may include, for example, a number of apertures that anticipates an initial deployment of the terminal 200, and additional capped apertures that can be uncovered and accessed by termination/connector connections or pass-through connections for post-deployment network upgrades, etc.

The connector ports 246, 248 can be used as, for example, upstream or downstream connection points that provide cable connectivity to and from the direction of the central office, or to and from the direction of the network edge. The cable connector ports 246, 248 can be configured to receive, either through termination/connector connections or in pass-through form, feeder cables to provide connectivity to a central office, and distribution cables that provide connectivity to the network edge.

A sealing gasket (not shown) may be disposed between the base 208 and the cover 212 to provide a seal against environmental elements such as wind-driven rain. The terminal 200 may be installed in a below grade location, for example, within a hand-hole or vault, in an aerial location such as a telephone pole or building facade, or in an above ground location. The enclosure 210 may be designed to provide a secure and sealed environment to accommodate the various installations.

A plurality of hardware mounting features 265 may be located on the interior 214 for fastening optical hardware, such as optical fiber storage trays, splice trays, splitters, routing guides, fiber organizers, powered modules, etc., within the terminal interior 214. In the illustrated embodiments, the mounting features 265 include projections and ridges integrally formed as part of the overall structure of the base 208. A slack basket (not shown) may be fastened to the hardware mounting features 265 and operable for receiving and storing slack lengths of optical fibers and/or optical fiber buffer tubes. Splice hardware 266 may be secured within the interior 214 by the hardware mounting features 265. The splice hardware 266 may include, for example, one or more splice trays. Splice trays are used when terminated or preterminated optical fibers are spliced in the field, such as when one or more optical fibers of a distribution cable 122 are accessed in the field to create a mid-span access location and spliced to interconnect the distribution cable 122 with one or more fiber optic media, such as branch cables, sub-branch cables, modules, series cables and/or drop cables 130. A strain relief bracket may also be secured to the interior 214 using the hardware mounting features 265. The strain relief bracket (which may also be a part of a splice tray) provides strain relief for the optical fibers entering and exiting, for example, the splice hardware 266.

Passive optical components in the terminal 200 may include, for example, one or more distribution splitters 268. Typically, feeder cables are multi-fiber optical cables, having for example 12-24 optical fibers. One or more of the optical fibers in the feeder cable may be optically connected to one or more of the distribution splitters in the terminal 200. Distribution splitters split the optical signals carried by the optical fibers in a feeder cable into multiple split optical signals. As examples, the distribution splitter may be any ratio of split, including 1×4, 1×8, 1×16, 1×32, 2×4, and 2×8.

The split optical signals may then be carried by one or more distribution cables 122, each having multiple optical fibers. The distribution cable 122 may have any number of optical fibers. For example, a distribution cable 122 may have 12, 24, 48, 72 or 96 optical fibers.

Referring to FIGS. 1 and 3, in an exemplary embodiment, the distribution cable 122 may enter the terminal 200, from the direction of the central office, through the connector port 246, and can exit the terminal 200 (with one or more fibers for example terminated or split within the terminal) through the connector port 248, in the direction of the network edge. In this example, the connector port 246 serves as an upstream connector port and the connector port 248 serves as a downstream connector port. The distribution cable 122 may be secured to one or more cable brackets (not shown) positioned adjacent to the appropriate ports. A cable bracket may define a notch along its length for securing a conventional cable tie, strap, hose clamp or other fastening mechanism around the distribution cable in a known manner.

The connectors (not shown) of the connectorized optical fibers may be routed within the interior 214 and connected to branch ports and/or cable ports (hereinafter referred to collectively as "connector ports") within the enclosure 210. With the cover 212 opened as shown in FIG. 3, the terminal interior 214 is readily accessible to a field technician initially installing the connectorized optical fibers into the respective connector ports. The field technician may create and route additional connectorized optical fibers to unused connector ports, or remove or rearrange optical connections between existing connectorized optical fibers and the connector ports. Once the terminal 200 is initially installed, the field technician may also add, remove or rearrange optical connections between optical fibers of preconnectorized cables and the respective connector ports from the exterior of the zone terminal 200 without the need for entering the enclosure 210. Since the terminal 200 does not have to be entered to connect, disconnect or reconfigure preconnectorized cables, additional preconnectorized cables can be connected without disturbing the previously installed preconnectorized cables or the contents of the terminal 200.

A shelf 270 may be used to mount splice hardware such as a splice tray, or other optical components, such as a splitter, within the interior 214. The splice hardware 266 may be used, for example, to splice terminated or preterminated optical fibers of the distribution cable 122 to pigtail optical fibers. The splice hardware 266 may be mounted to either the top or bottom surface of the shelf 270, or within slots provided with the shelf 270. As shown, the shelf 270 is secured by conventional fasteners to an interior wall of the base 208 at one or more locations. The exemplary embodiment of the terminal 200 comprises twelve connector ports 244 on the cover 212 for receiving up to twelve connectorized optical fibers within the interior of the terminal 200 and up to twelve preconnectorized cables on the exterior of the terminal 200. The connections may also include metallic cable connections for coupling external modules to power sources in the terminal interior 214.

Figure 4:
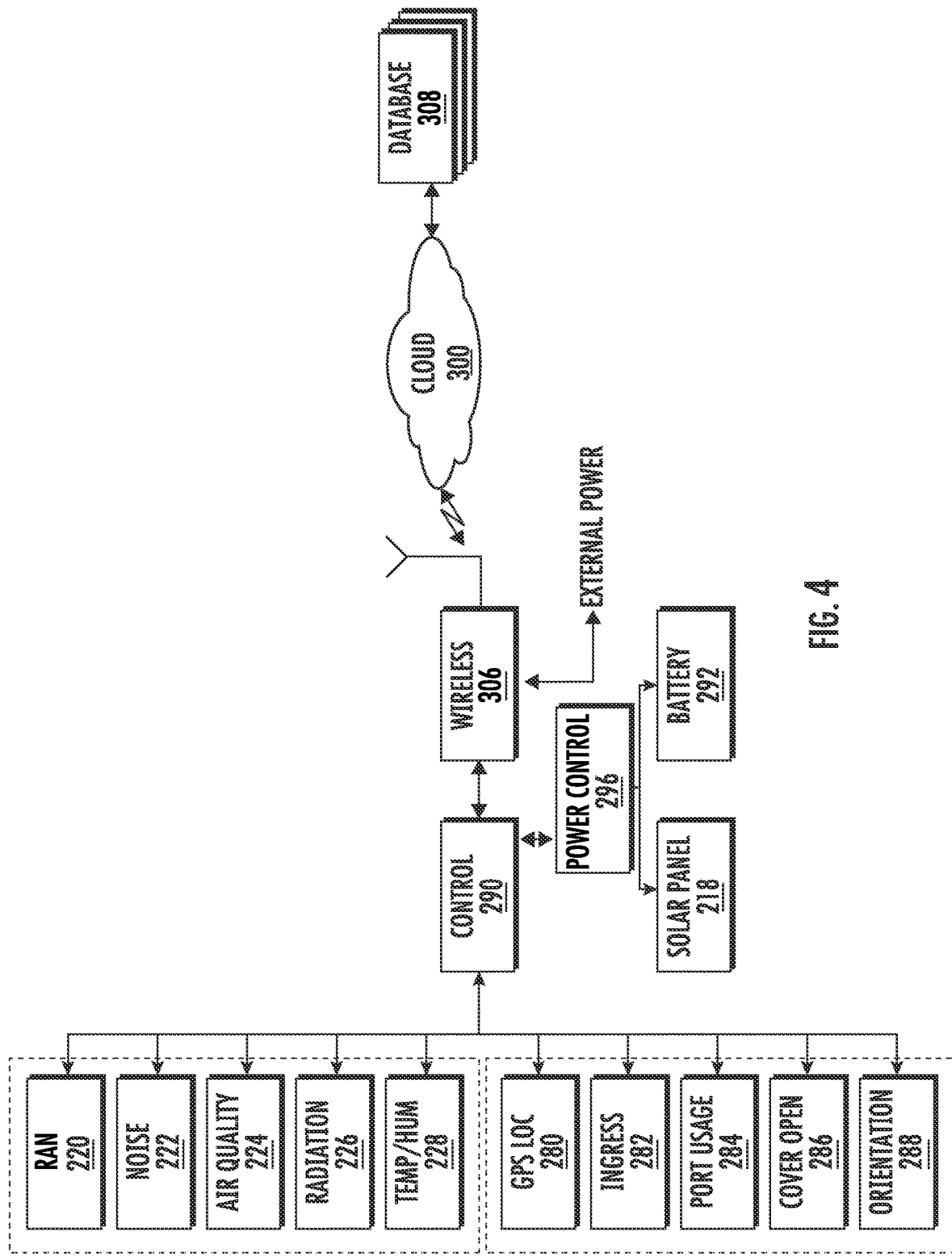
FIG. 4 is a schematic of the terminal of FIG. 2 interacting with cloud-based servers.

The external, active modules 218, 220, 222, 224, 226, 228 can be selected to provide a variety of functionalities to be managed or hosted at the terminal 200. According to one embodiment, the terminal 200 may further include internal modules 280, 282, 284, 286, 288, 290, 292 that are accommodated within the interior 214 of the enclosure 210. FIG. 4 is a schematic representation of the terminal 200 illustrating the various functionalities of the external and internal modules. The description of the various modules as being "external" versus "internal" to the enclosure 210 are not intended to exclude the deployment of any of the modules either within or without the enclosure. Instead, the terms "external" and "internal" are only used to describe the location of the modules in the illustrated, exemplary embodiment. Further, the modules are shown as separate hardware components in the figures. In practice, the functionality and associated hardware of a particular module may be amenable to combine with another module or modules so that the multiple functionalities are carried out by a single, combined module.

Referring to both FIG. 3 and FIG. 4, the external modules 218, 220, 222, 224, 226, 228 may have the following functionalities: solar power module 218, radio access node 220, noise measurement module 222, air quality measurement module 224, radiation measurement module 226, and temperature/humidity measurement module 228. The internal modules 280, 282, 284, 286, 288, 290, 292 may have the following functionalities: GPS location module 280, enclosure water ingress module 282, connector port usage module 284, enclosure cover open sensing module 286, enclosure orientation/vibration sensor module 288, control module 290, and battery module 292. The various module functionalities are discussed in further detail below.

The control module 290 is configured to control operation of one or more of the internal and external modules, including directing power usage of the modules, receiving data from the modules and reporting to the network operator, executing operational instructions for the modules, status monitoring, and other management functions for the active modules of the terminal 200. A microprocessor can be included in the control module 290 with sufficient processing power and memory to operate a wide range of anticipated module functionalities. However, because power available to the terminal 200 may be limited, particularly when the solar power module 218 is the only available power source, processing requirements may be offloaded to the cloud 300 via a wired or wireless connection. It may be convenient to push processing functions from the control module 290 to the cloud 300, for example, when a function need not be performed in real time or near real time. For example, the collection of environmental data such as noise, light, pollution etc. can be collected at selected intervals at the request of a network operator.

In one embodiment, the terminal 200 includes an internal wireless module 306, such as a cellular modem, either as part of the control module 290 or connected to the control module, that is used for uplink and downlink communications with the cloud 300. One or more service databases 308 for the network 100, or for specific parts of the network 100 such as an individual terminal 200 or a group of terminals, can be hosted in the cloud 300 to coordinate and manage the various functions of the terminal 200. The internal wireless module 306 can be used to establish a communication link, for example, between IoT-type active modules and cloud-based IoT applications servers. Those cloud-based IoT application servers can then serve to manage the data as well as provide analyses and routing of the data. The network operator, customers, subscribers etc. can call different applications for download, further analysis, processing, and/or use of the data.

In one embodiment, the control module 290 is configured to undergo regular reading and reporting of data from the active modules, with the frequency at which data is read from each module being selectable depending upon the exigency of the data. Information regarding the operation of the network 100, such as a power failure, an open enclosure cover, or water ingress, that may jeopardize the operability of all or part of the network, may be polled more frequently and actively by the control module 290, and thus will utilize more of the processing power of the control module 290. For example, in some applications, the control module 290 can be programmed such that emergent events such as a significant spike in radiation at the terminal 200 will prompt an immediate notification to the network operator either through a wireless upload to the cloud 300, or through utilization of one of the passive optical connections in the terminal. For this reason, the control module 290 may include one or more direct optical links to the central office 104 and even to downstream network nodes and/or subscribers at the network edge.

One method of notification to network operators can be a text message or email sent to a dedicated recipient(s) when an event such as a cover open status is detected. The notification can include, for example, a fault code report and the geographic location or address of the terminal 200. Each of the modules disclosed herein can be associated with one or more codes used to communicate different status updates, alarms, and other transmissions that relate to the data gathered by a respective module. The control module 290 can be configured to control notifications regarding one or more of the modules. The notification can also include a code describing the type of mounting of the terminal 200, such as telco pole or building façade, so that the responding field technician is alerted as to what equipment may be needed to access the terminal 200.

Wireless connectivity with devices external to the terminal 200 can be achieved via any applicable standard of wireless communications. For example, communication with the cloud 300 or directly with network operators can be effected via the cellular LTE network. LTE modems are now available that are optimized for the collection of IoT data such as temperature and humidity, etc. Such cellular modems may have a low data rate (~1 Mbps) and low power consumption, and are of relatively low price.

In some applications carrier operators are interested in monitoring the cellular signal strength and interference within a specific environment. The wireless module 306 can be configured to gather such data for reporting to cloud-based applications. IoT modems are available that can perform the function of spectrum monitoring in the terminal environment.

The solar power module 218 can include one or more solar panels connected to a connector port(s) 244 by the cable 219 and can be selected and oriented to satisfy all of the electrical power needs of the terminal 200. The solar power module 218 can be mounted on the exterior of the enclosure 210, or mounted on a nearby structure such as a pole or building. The cable 219 can include both electrically conductive and fiber optic conductors to convey electrical power and management instructions between the power module 218 and the control module 290. The terminal's active modules can be powered through the control module 290, which can include power conditioning and routing. A power conditioning module or circuit 296 can be included within the control module 290, or a separate power conditioning and control module 296 (shown schematically in FIG. 4) can be interposed between the battery module 292 and the solar power module 218, and the control module 290.

It is expected that the solar power module 218 would power all or a part of the terminal 200 operations during normal operating conditions, and also maintain the battery module 292 in a charged state to account for periods of low sunlight. Because the solar power module 218 may experience prolonged periods of low sunlight, and the battery module 292 has a defined storage capacity, the terminal 200 may experience periods during which electrical power is limited. In response, the control module 290, locally or through instruction from a cloud-based application, can selectively prioritize power to more critical functions of the terminal 200. For example, network operability modules may have prioritized power usage over routine environmental data collection features. The network operator can select which functions of the terminal 200 are to be prioritized at the cloud-based applications.

In the exemplary embodiment illustrated in FIG. 2, the radio access node 220 is mounted to the body of the enclosure 212. The radio node 220 can be, for example, bolted to the cover 212 by one or more bolts. An intermediate mounting plate or mounting bracket (not shown) can be mounted to the cover 212 to facilitate mounting of the radio access node 220 on the cover 212. In another embodiment, the cover 212 is a single, molded monolithic housing that accommodates radio access node hardware as well as functioning as a cover for the terminal 200.

In the configuration of FIG. 2, in which the radio node 220 is mounted directly to the enclosure 210, the radio access node 220 can be connected to the terminal interior 214 by a cable such as a composite cable extending through an aperture 293 in the cover 212, and connecting to the control module 290 or to a power source such as the battery module 292. Alternatively, the radio access node 220 can be externally connected to a port 244 of the terminal by a cable (not shown) having both optical and electrical conductors, which can be coupled to the control module 290 by a cable within the enclosure 210. The small cell 220 can be connected to a 'local' power source located near the terminal 200, or it can be powered from power provided from the enclosure 210. Backhaul optical connectivity back to other terminals, secondary concentrations, primary concentrations, and to the central office can be effected by communicative coupling of the radio access node 220 to fiber optic connectivity hardware in the enclosure interior, which is in turn optically communicatively coupled to the wider network. The radio access node 220 can, for example, be connected to the downstream network via the control module 290.

The noise measurement module 222 can include a sound meter, such as a digital sound level meter, mounted outside of the enclosure 210 in an orientation so as to detect ambient sound in the terminal 200 environment. The sound measurement module 222 can be connected to a connector port 244 by a cable 232 such as a composite cable, and can be coupled to the control module 290 by a cable such as a composite cable within the enclosure 210.

The air quality module 224 can include an air quality meter configured to measure desired air quality properties, such as carbon monoxide, carbon dioxide, radon, and ozone content, and particulate air pollutants. The air quality module 224 can be mounted outside of the enclosure 210 in an orientation so as to detect ambient air quality in the terminal 200 environment. The air quality module 224 can be connected to a connector port 244 by a cable 234 such as a composite cable, and can be coupled to the control module 290 by a cable such as a composite cable located within the enclosure 210. Air quality modules can be deployed at selected terminals in the network 100. This data may be useful for private or governmental entities interested in monitoring air quality.

The radiation measurement module 226 can include a radiation detector, such as a particle detector, mounted outside of the enclosure 210 in an orientation so as to detect ambient radiation in the terminal 200 environment. The radiation measurement module 226 can be connected to a connector port 244 by a cable 236 such as a composite cable, and can be coupled to the control module 290 by a cable such as a composite cable located within the enclosure 210. Radiation measurement modules can be deployed at selected devices in the network. This data may be useful for private, security, or governmental entities interested in monitoring radiation levels in the network environment.

The temperature and humidity measurement module 228 can include a digital module capable of collecting temperature and humidity data. The module 228 can be mounted outside of the enclosure 210 in an orientation so as to detect ambient meteorological conditions in the terminal 200 environment. The temperature and humidity measurement module 228 can be connected to a connector port 244 by a cable 238 such as a composite cable, and can be coupled to the control module 290 by a cable such as a composite cable located within the enclosure 210.

The GPS location module 280 can be a GPS location tracker that can be mounted within the enclosure 210 and connected to the control module 290. Carrier and network operators may use GPS location information to direct field services for servicing and maintenance of the terminal 200. GPS functionality can also provide the location of the terminal 200, for example, in the planning process for a network. If, for example, a network incorporating the terminal 200 is to be expanded, network planners can obtain an up-to-date schematic of all terminals 200 in the network using GPS location functionality. The GPS location module 280 can be connected to the control module 290 by a cable such as a composite cable within the enclosure 210.

The water ingress module 282 can include water ingress sensors, such as a device that senses a reduced resistance between two contacts that results from the presence of water between the contacts. Ingress module sensors can be located along the mating point of the base 208 and the cover 212 where water is presumed to be most likely to enter the enclosure 210, or at a low point in the interior of the enclosure 210 where water is likely to collect. If water is detected in the enclosure 210, the control module 290 can send a notification to the cloud or directly to the network operator as a prompt to repair the terminal 200 before damage is caused to components therein. The water ingress module 282 can be connected to the control module 290 by a cable such as a composite cable within the enclosure 210.

The port usage module 284 can include, for example, one or more magnets (not shown) that detect when a connector port 244 is in use. The control module 290 can report port utilization data to the network operator or planner, as well as carrier operators. Port utilization data is valuable to the network planner as it allows the planner to evaluate whether additional terminals are required or whether existing terminals are sufficient to support existing and planned expanded network functionalities.

The cover open module 286 detects when the cover 212 is opened. If an open state is detected the control module 290 can send a notification to a network operator to indicate that the device is either damaged, being tampered with, or possibly if a service technician forgot to close the enclosure cover 212. The cover open module 286 can be connected to the control module 290 by a cable such as a composite cable within the enclosure 210.

The terminal orientation/vibration sensor module 288 can be provided to enable the network operator to determine whether the closure 200 has been upset from its optimum orientation. The terminal orientation/vibration sensor module 288 can include, for example, one or more accelerometers to detect motion and displacement of the terminal 200. If, for example, the terminal 200 becomes wholly or partially disconnected from its mounting structure, the control module 290 can provide a notification can be provided to the network operator. If the terminal 200 is swaying or moving beyond expected parameters, such as might happen when the terminal is pole-mounted and under high winds, the control module 290 can send a notification to the network operator for evaluation of whether maintenance should be performed on the terminal 200. The accelerometers of the terminal orientation/vibration sensor module 288 can also be used to detect vibration of the terminal, such as vibration caused by seismic activity. Analysis of the motion and position data collected by the orientation module can be performed within cloud-based applications so as to minimize usage of the control module's processing power. The terminal orientation/vibration sensor module 288 can be connected to the control module 290 by a cable such as a composite cable within the enclosure 210.

FIG. 5 illustrates an exemplary deployment environment for network terminals 200. The network terminals 200 can be mounted to, for example, a vertical surface 400. As shown in FIG. 5, multiple terminals 200 can be deployed at a location that can be, for example, a secondary concentration point as generally indicated in FIG. 1. The collocated terminals 200 can be interconnected with a plurality of cables, as well as each being connected to multiple fiber optic cables that extend in both the upstream and downstream directions. One or more terminals 200 at the deployment location can include a radio access node 220 for providing wireless services to a coverage area of the deployment location.

Figure 6A:
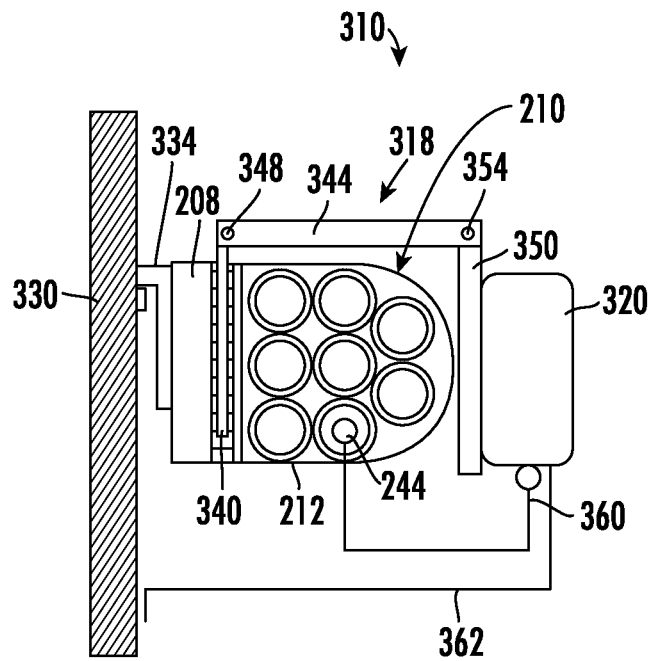
FIG. 6A illustrates a terminal having a support structure according to a present embodiment with a cover of the terminal closed.
Figure 6B:
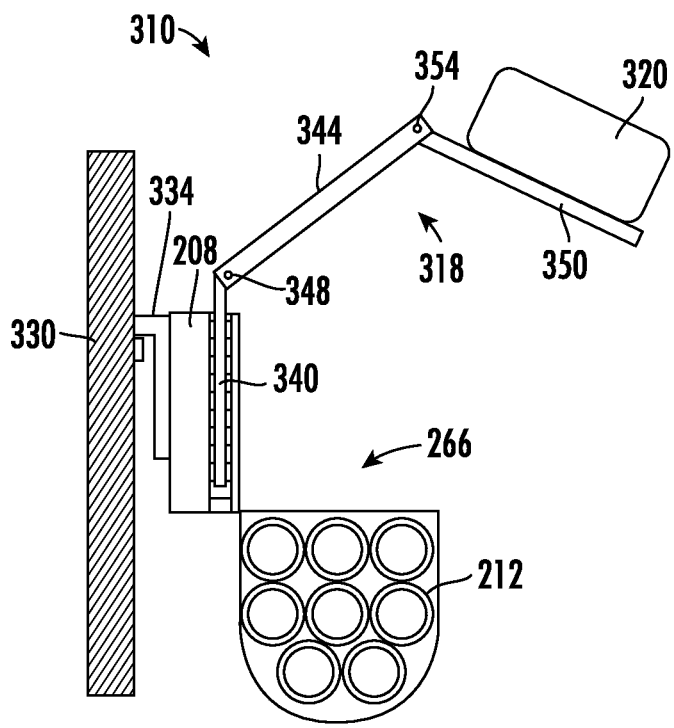
FIG. 6B illustrates the terminal of FIG. 6A with the cover of the terminal opened.

FIG. 6A illustrates a terminal 310 having a support structure 318 that may be used to support a radio access node 320 and other external modules. The terminal 310 be similar in construction to the terminal 200 discussed above, and can have an enclosure 210, a base 208, and a cover 212, as well as the same general structure, components, and functions as the terminal 200. The terminal 310, however, is adapted to be secured to and interoperate with the support structure 318. In FIG. 6A the cover 212 of the terminal 310 is closed, while FIG. 6B illustrates the terminal 310 with the cover opened and the support structure 318 pivoted and extended away from the terminal base 208. For simplicity of illustration, the only powered module illustrated in and discussed with reference to FIGS. 6A and 6B is the radio access node 320.

The terminal 310 can be mounted to a surface 330 by a mounting bracket 334 that is secured to the base 208. In the illustrated embodiment, the mounting bracket 334 secures the terminal 310 to a surface 330 that generally perpendicular to the ground, but other orientations are possible for the terminal 310, such as in angled and horizontal surface mountings. The mounting bracket 334 can include one or more apertures through which fastening mechanisms, such as bolts or wall anchors suitable for connection to brick or mortar, can extend to secure the mounting bracket 334 to the surface 330.

In the illustrated embodiment, the support structure 318 is an articulated bracket with a first section 340 secured to the enclosure 210, a second section 344 pivotably connected to the first section 340 at a pivot 348, and a third section 350 pivotably connected to the second section at a pivot 354. The third section 350 is configured to movably secure and support the radio access node 320. The first section 340 can be secured within a slot in the base 208. The third section 350 can include a plurality of apertures to allow for attachment of, such as by nut and bolt, the radio access node 320 at a variety of locations on the support structure 318.

The radio access node 320 can be connected to a port 244 of the terminal by a cable 360 having one or both of optical fibers and electrical conductors. The radio access node 320 can thus draw power and also maintain data connectivity through the terminal 320. In one embodiment, the radio access node 320 connects via a cable 362 to a local power source (not shown) that is external to the terminal 310 and located in the vicinity of the terminal.

FIG. 6B illustrates the terminal with the cover 210 open and the radio access node 320 pivoted away from the enclosure 210. In this configuration, splicing hardware 266 and other passive connectivity components, as well as any active components within the enclosure interior can be easily accessed without interference from the radio access node 320. A field service technician can therefore perform maintenance on the terminal 310 with all terminal components self-supporting during the maintenance work.

Figure 7A:
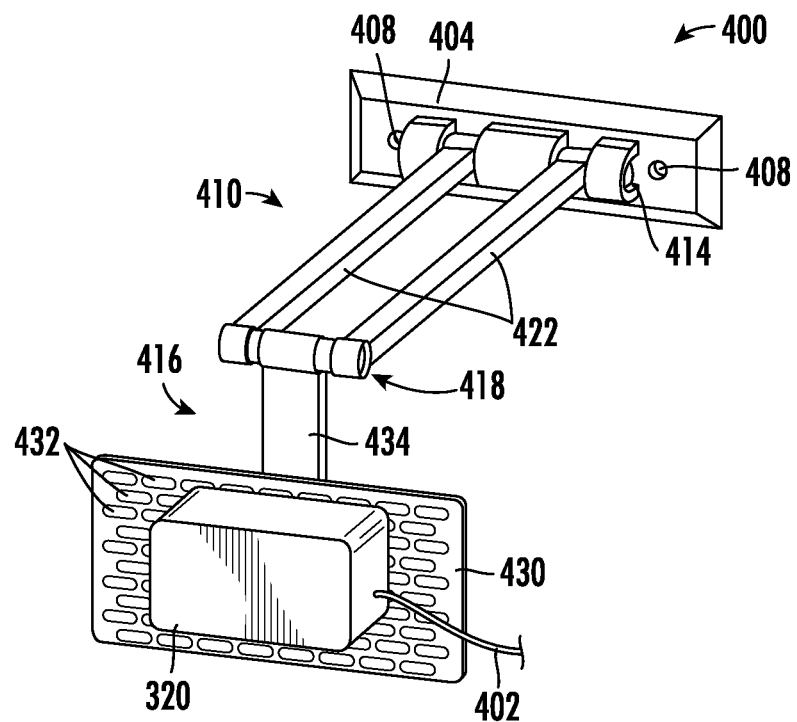
FIG. 7A is a perspective view of a support structure according to an embodiment.
Figure 7B:
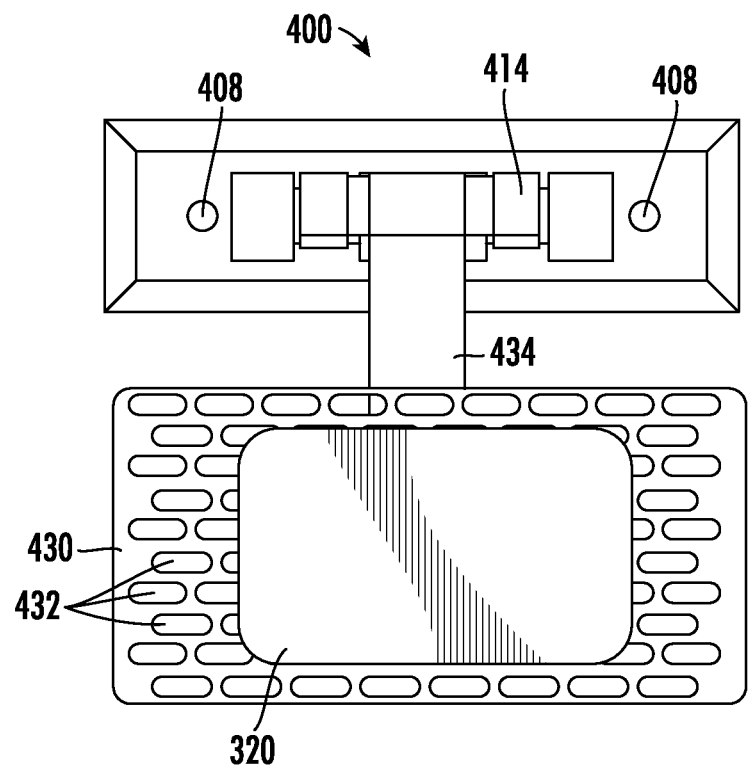
FIG. 7B is a front view of the support structure of FIG. 7A.

FIGS. 7A and 7B illustrate a support structure 400 for a radio access node 320, where the support structure 400 is configured to be mounted on a surface (not shown), on which surface a terminal (e.g. a terminal 200) associated with the radio access node 320 is also mounted proximate to the radio access node. The terminal 200 can be communicatively and electrically coupled to the radio access node 320 to provide, for example, power and optical connectivity to the radio access node 320. In one embodiment, the radio access node 320 is coupled to the interior of the terminal 200 by a cable 402. The cable 402 can include one or more optical and electrical conductors to provide power and data connectivity to the radio access node 320.

The support structure 400 includes a mounting bracket 404 having apertures 408 through which fastening mechanisms, such as bolts or wall anchors suitable for connection to brick or mortar, can extend to secure the support structure 400 to wall surface. The mounting bracket 404 can have a generally flat, plate-like structure with a beveled periphery. The surface to which the support structure 400 is mounted can be, for example, the façade of a building.

The mounting bracket 404 is pivotably connected to a first section 410 at a first pivot 414, and the first section 410 is pivotably connected to a second section 416 at a second pivot 418. The first section 410 can include two elongate arms 422 that extend parallel to one another and that connect to opposite ends of the second pivot 418. The second section 416 can include a mounting platform 430 connected to the second pivot 418 by an arm 434 of the second section 416. The mounting platform 430 can have a generally flat, plate-like structure, and its size can be selected to support a desired radio access node or other hardware intended for the deployment environment. The mounting platform 430 can include a plurality of apertures 432 to allow for attachment of, such as by nut and bolt, the radio access node 320 and other active hardware at a variety of locations on the support structure 400. The apertures 432 also serve to reduce the weight of the support structure 400.

The support structure 400 increases the selection of deployment options for a network operator, in that a terminal 200 may be mounted at a convenient location and the support structure 400 and thus the radio access node 320 can be placed at a different, optimal location. The distance between the radio access node 320 and the terminal 200 can be selected according to demands of the planned network, such as if the terminal 200 is used as a power source for the radio access node and a short distance is preferable to reduce loss in the electrical conductors connecting the two.

A single terminal 200 can service a plurality of radio access nodes. For example, multiple radio access nodes mounted on support structures 400 or by other mounting arrangements, as well as a radio access node 220 supported directly on the terminal 200 (as shown in FIGS. 2 and 3), can be serviced by a single terminal 200.

The support structure 318 and the support structure 400 disclosed herein can be constructed of relatively rigid materials of sufficient durability to withstand environmental factors such as wind and rain. Metals and plastics can be used materials of construction. In order to facilitate ease of installation, lightweight materials such as molded plastics and aluminum may be used. According to one embodiment, the terminal associated with the radio access node 320 is mounted within 10 meters of the radio access node 320.

The radio access nodes described herein may be, for example, small cells, and can be operator-controlled in licensed, shared or unlicensed spectra. Small cells can be deployed, for example, to create a secure channel back to a carrier network over an Internet connection to provide reliable wireless radio-frequency connectivity to users within a coverage area of the radio access nodes. Radio access nodes can be deployed so as to improve or complement macro network coverage in the vicinity of the terminal, add targeted capacity, and to support new services and user experiences. Examples of radio access networks are described in U.S. Pat. Nos. 9,516,600 and 10,111,235, the entire contents of which are hereby incorporated by reference.

There are several types of small cells, including femtocells, picocells, nanocells, and metrocells. Small cells operate at lower power (typically a range of 5 W-30 W) as compared to macro cells, and are sometimes referred to as "microcells." Radio access nodes operating in power range of 1 W to 5 W can be considered picocells, and those operating in the range of less than 1 W may be considered femtocells.

Small cells can be fully integrated base stations with radio modules that vary in output power. A small cell can be of a 'standalone' configuration, in which the small cell includes an integrated access radio antenna, and backhaul radio and antenna in a single assembly. In a C-RAN radio access node deployment, a centralized unit performs baseband processing for multiple small cell radios that are distributed through a larger coverage area.

The height of deployment for the radio access nodes described herein and their associated terminals is selected to accommodate the expected coverage area of the radio access node. Given the range restrictions for radio access node coverage areas, a network integrator may limit the deployment height for a radio access node. For example, a radio access node according to the present embodiments may be mounted at a height of less than 10 meters above ground level. According to one embodiment, a radio access node may provide wireless connectivity to at least ten users within its coverage area.

According to one aspect, radio access nodes can be deployed to supplement wireless services in locations that utilize a deployed base of fiber optic terminals. According to another aspect, new network deployments can be deployed with radio access nodes paired with fiber optic terminals that provide passive connectivity, active control and processing, and power, of the radio access nodes.

According to another aspect, the network operator can monitor network environment, functionalities and operational effectiveness, continuity, and other indications of network operability or 'network health' using the various modules and capabilities described herein. The network operator, or another entity named as owner or licensor of collected data, can for example license or sell collected data on specified economic terms. Data describing the network environment, which can be described as 'parametrization of the network environment', can be provided to third parties such as local government, law enforcement, and other interested parties.

In this specification, the terms "connect," "interconnect," and "couple" shall, if not specifically described as one type of connection, include the enablement of the transmission of one or both of optical and/or electrical signals, whether directly or indirectly, between components, nodes, cables, and the like. An optical terminal may be adapted to accommodate a variety of connector types, such as simplex and/or duplex SC, LC, DC, FC, ST, SC/DC, MT-RJ, MTP, MPO connectors. Further, an optical terminal may be adapted to accommodate ruggedized connectors for outside plant installations. Examples of such ruggedized connectors include, OptiTap® or OptiTip® connectors available from Corning Optical Communications LLC.

Many other modifications and embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic terminal, comprising:
an enclosure, comprising:
 a plurality of connector ports;
 a base formed from a plastic and comprising opposed end walls and opposed side walls, at least four of the connector ports being located at the end walls; and
 a cover formed from a plastic hingedly connected to the base, wherein the base and the cover define a terminal interior, and wherein at least two of the connector ports are located at the cover;
fiber optic connectivity hardware disposed within the terminal interior, wherein at least one cable optically couples at least one of the connector ports to the fiber optic hardware;
a powered control module coupled to at least one of the connector ports;
a support structure connected to the enclosure; and
a plurality of active modules, at least one of the active modules being a radio access node having at least one antenna and being mounted on the cover, wherein
the enclosure has a length measured between the opposed end walls of the base of less than one meter.

2. The fiber optic terminal of claim 1, wherein the fiber optic hardware includes splice hardware, the splice hardware including at least one 1×N optical splitter, and wherein the cover comprises a curved upper section.

3. The fiber optic terminal of claim 2, wherein the radio access node is connected to the terminal interior through at least one of the connector ports.

4. The fiber optic terminal of claim 2, wherein the radio access node is connected to the terminal interior through an aperture in the cover.

5. A fiber optic terminal, comprising:
an enclosure, comprising:
a plurality of connector ports;
a base formed from a plastic and comprising opposed end walls and opposed side walls, at least four of the connector ports being located at the end walls; and
a cover formed from a plastic hingedly connected to the base, wherein the base and the cover define a terminal interior, and wherein at least two of the connector ports are located at the cover;
fiber optic connectivity hardware disposed within the terminal interior, wherein at least one cable optically couples at least one of the connector ports to the fiber optic hardware;
a powered control module coupled to at least one of the connector ports;
a support structure connected to the enclosure; and
a plurality of active modules, at least one of the active modules being a radio access node having at least one antenna and being mounted on the support structure, wherein
the enclosure has a length measured between the opposed end walls of the base of less than one meter.

6. The fiber optic terminal of claim 5, wherein the support structure comprises a mounting platform on which the radio access node is mounted, and a plurality of pivotably connected sections, the plurality of pivotably connected sections being pivotably connected to the mounting platform.

7. The fiber optic terminal of claim 6, wherein the plurality of pivotably connected sections comprises a first section fixedly connected to the enclosure, and a second section pivotably connected to the first section.

8. The fiber optic terminal of claim 7, wherein the support structure includes a third section pivotably connected to the second section, and wherein the mounting platform is pivotably connected to the third section.

9. The fiber optic terminal of claim 7, wherein the mounting platform includes a plurality of apertures, at least one fastener extending through at least one of the apertures to secure the radio access node to the mounting platform, and wherein the terminal comprises a mounting bracket fixedly connected to the base and configured to mount to a mounting surface.

10. The fiber optic terminal of claim 6, wherein the fiber optic hardware includes splice hardware, the splice hardware including at least one 1×N optical splitter, and wherein the cover comprises a curved upper section.

11. A fiber optic terminal, comprising:
an enclosure, comprising:
a plurality of connector ports;
a base formed from a plastic and comprising opposed end walls and opposed side walls, at least four of the connector ports being located at the end walls; and
a cover formed from a plastic hingedly connected to the base, wherein the base and the cover define a terminal interior, and wherein at least two of the connector ports are located at the cover;
fiber optic connectivity hardware disposed within the terminal interior, wherein at least one cable optically couples at least one of the connector ports to the fiber optic hardware;
a powered control module coupled to at least one of the connector ports;
a support structure mounted to a surface proximate to the enclosure; and
a plurality of active modules, at least one of the active modules being a radio access node having at least one antenna and being mounted on the support structure, wherein
the enclosure has a length measured between the opposed end walls of the base of less than one meter.

12. The fiber optic terminal of claim 11, wherein the support structure comprises a mounting platform on which the radio access node is mounted.

13. The fiber optic terminal of claim 12, wherein the support structure comprises a plurality of pivotably connected sections, the plurality of pivotably connected sections being pivotably connected to the mounting platform.

14. The fiber optic terminal of claim 13, wherein the plurality of pivotably connected sections comprises a first section fixedly connected to the enclosure, and a second section pivotably connected to the first section, wherein the support structure includes a third section pivotably connected to the second section, and the mounting platform is pivotably connected to the third section.

15. The fiber optic terminal of claim 13, wherein the mounting platform includes a plurality of apertures, at least one fastener extending through at least one of the apertures to secure the radio access node to the mounting platform, and wherein the support structure comprises a mounting bracket fixedly connected to the base and configured to mount to a mounting surface.

16. The fiber optic terminal of claim 13, wherein the fiber optic hardware includes splice hardware, the splice hardware including at least one 1×N optical splitter, and wherein the cover comprises a curved upper section.

17. The fiber optic terminal of claim 14, wherein the fiber optic hardware includes splice hardware, the splice hardware including at least one 1×N optical splitter, and wherein the cover comprises a curved upper section.

18. The fiber optic terminal of claim 15, wherein the fiber optic hardware includes splice hardware, the splice hardware including at least one 1×N optical splitter, and wherein the cover comprises a curved upper section.

* * * * *